Figure 1:
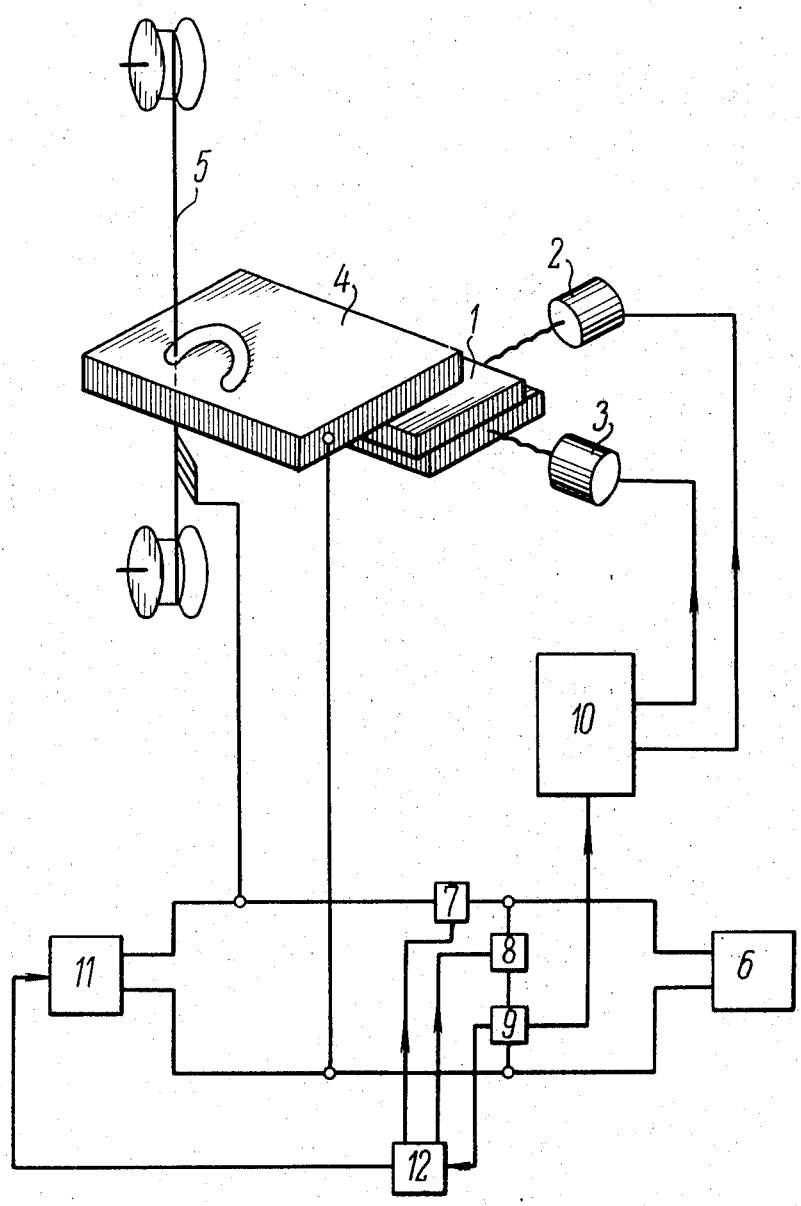

United States Patent
Raznitsyn

[15] 3,671,705
[45] June 20, 1972

[54] METHOD OF ELECTROEROSION MACHINING OF PARTS AND DEVICE FOR EFFECTING SAME

[72] Inventor: Mikhail Alexeevich Raznitsyn, ul Arbat 54/2, kv. 83, Moscow, U.S.S.R.

[22] Filed: Aug. 12, 1970

[21] Appl. No.: 63,296

Related U.S. Application Data

[63] Continuation of Ser. No. 654,836, July 20, 1967.

[52] U.S. Cl. .......................... 219/69 C, 219/69 G, 219/69 V
[51] Int. Cl. ....................................... B23p 1/08, B23p 1/14
[58] Field of Search .................... 219/69 C, 69 R, 69 G, 69 P, 219/69 V

[56] References Cited

UNITED STATES PATENTS 3,213,258  10/1965  Ferguson ........................... 219/69 P Primary Examiner—R. F. Staubly

[57] ABSTRACT

A method and device for effecting electroerosion machining comprises a high-frequency source of pulses of a relatively low amplitude of current and a low-frequency source of pulses of a relatively high amplitude of current controlled by circuits for automatically switching over said sources in response to a decrease in the interelectrode gap value and for switching them back after a predetermined period of time. Alternatively a source of variable frequency of pulses of electric energy with a high amplitude of voltage may be employed with a pulse step-down transformer and circuits for automatic decrease of the frequency of the source and its direct connection with the electrodes for a predetermined period of time in response to a decrease in the interelectrode gap value, there being provided control elements for disconnecting the windings of the transformer and directly connecting the high-voltage source with the electrodes, and for restoration of the circuits after a predetermined period of time.

8 Claims, 3 Drawing Figures

METHOD OF ELECTROEROSION MACHINING OF PARTS AND DEVICE FOR EFFECTING SAME

This application is a continuation of application Ser. No. 654,836, filed July 20, 1967.

The present invention relates to methods of electroerosion machining of parts by pulses of discharge electric current and to devices for effecting same.

The invention is intended to be used for tool production in various branches of industry.

Known in the prior art are methods of electroerosion machining of parts, to be effected by passing working pulses of discharge current through electrodes and by relative transfer of the electrodes along the prescribed trajectory in a follow-up mode of feed (see, for example, "Manual of electric and ultrasonic methods of machining materials", by L.Ya.Popilov, Mashgiz, Moscow-Leningrad, 1963, page 250).

Also known in the prior art are devices for carrying into effect said methods of electroerosion machining, comprising electrodes, a generator of working pulses, and a measuring instrument, connected in parallel, and a follow-up system for effecting a directed relative transfer of electrodes (see, for example, "Automation of electric spark and anode-mechanical machine tools", Mashgiz,Moscow-Leningrad,1952, page 55).

The existing methods of electroerosion machining, however, have the disadvantage that in case of a casual contact between the electrodes, the process of removing material from the part to be machined is discontinued, the pulse current density flowing through the areas of actual contact being insufficient for their separation.

Therefore the existing devices for effecting said electroerosion machining processes are designed so as to permit resuming of the machining process interrupted by the casual contact between the electrodes by drawing apart the electrodes along the path they have covered.

In case the working electrodes move along two or more coordinates in the course of their relative transfer, this peculiar feature considerably complicates the system of automatic control of the relative transfer of the electrodes, requiring their provision with an intermediate memory for effecting the non-programmed reversal of the working feed along the covered trajectory and return to the earlier reached point.

An object of the present invention is to provide such a method of electroerosion machining of parts and a device for its realization, which permits the employment of standard systems used in automation of metal-cutting machines for the transfer control, to effect automatic control of multiple-coordinate relative transfer of the working electrodes of the electroerosion machine tool.

In conformity with the above and other objects, the essential feature of the present invention consists in applying the method of electroerosion machining of parts, by passing working pulses of a discharge current through electrodes and by relative transfer of the electrodes along the prescribed trajectory in a mode of follow-up feed, in which, according to the invention, at the moment of a casual contact between the electrodes the latter are not brought apart, and auxiliary pulses of current are passed with an amplitude greater than that of the short-circuit current for a period of time required to eliminate the contact thus formed by virtue of the contact electric erosion.

It is advisable that for the time of passing the auxiliary pulses of current through the contacting electrodes the passing of the working impulses be discontinued.

In the device for effecting the method of electroerosion machining of parts, comprising electrodes, a generator of working pulses, a measuring instrument, and a follow-up system for effecting directed relative transfer of the electrodes, according to the invention, there is provided an auxiliary generator, connected to the electrodes, and a master switch, connected to the measuring instrument and auxiliary generator for actuating the latter with the arrival of a signal from the measuring instrument in case of a casual contact between the electrodes.

It is expedient that the circuit of the measuring instrument and generator of working pulses keys be provided, connected to the master switch.

Figure 2:
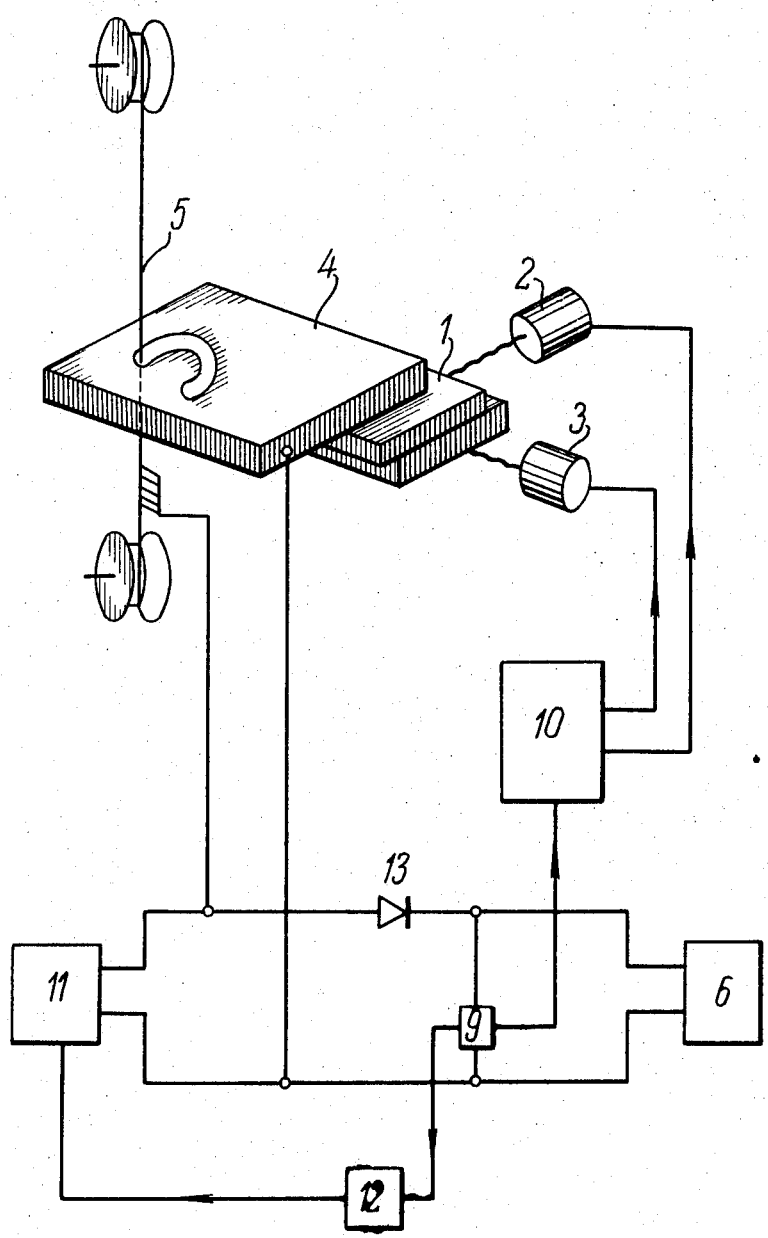
Figure 3:
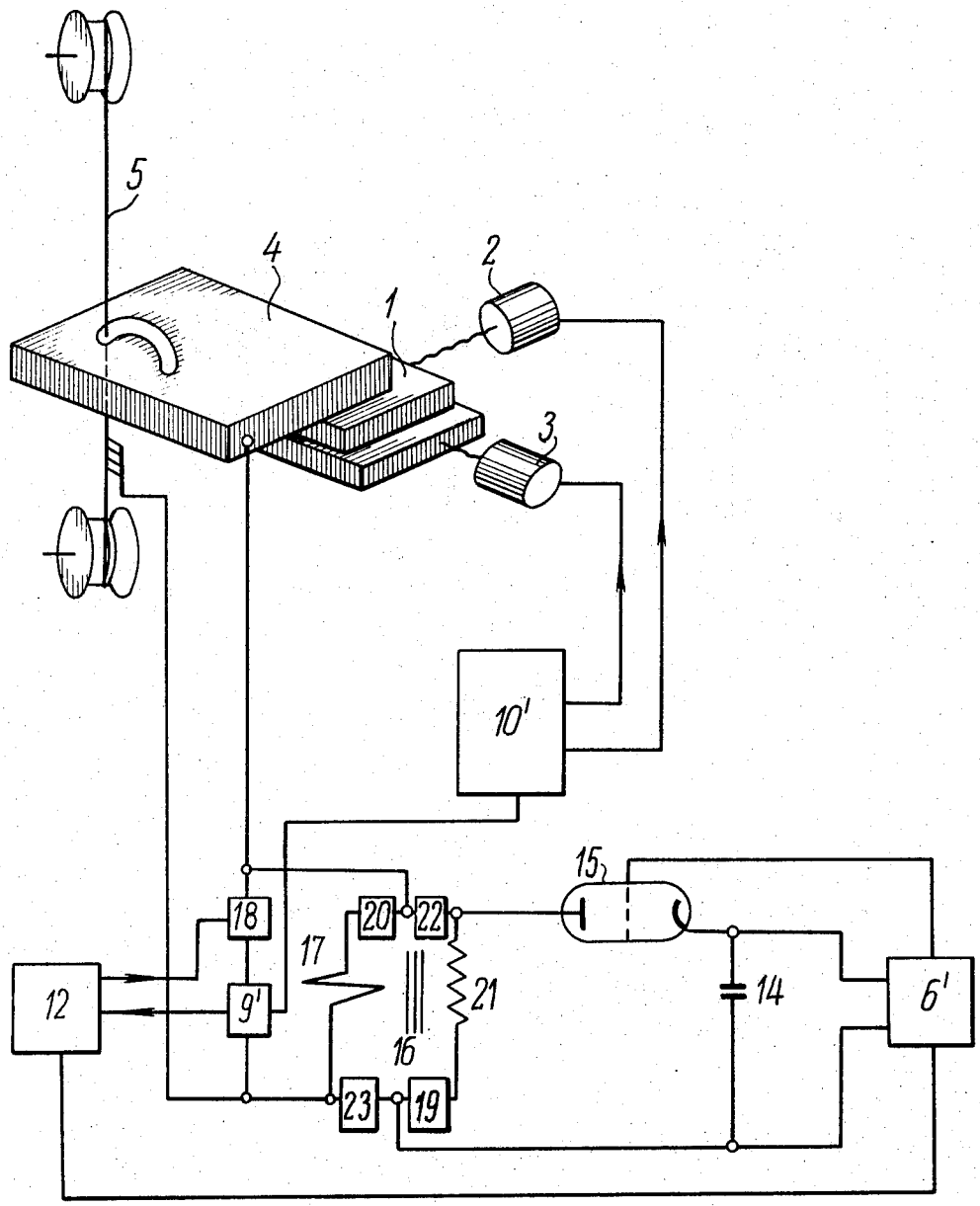

Other objects and advantages of the present invention will become more fully apparent from a consideration of the following description of exemplary embodiments thereof, taken in conjunction with the accompanying drawings, in which:

FIG. 1 represents a device and an electric circuit diagram of the device with an auxiliary generator, according to the present invention;

FIG. 2 diagrammatically represents another embodiment of the electric circuit of the device with the auxiliary generator, according to the present invention;

FIG. 3 represents still another embodiment of the electric circuit of the device, according to the present invention.

The device for the electroerosion machining of parts (FIG. 1) comprises a two-coordinate table 1, driven by electric motors 2 and 3, said table 1 mounting a workpiece-electrode 4 to be machined. The workpiece-electrode 4 and a tool-electrode 5 are connected to the output of a generator 6 of working pulses through a controllable key 7.

Connected in parallel with the electrodes 4 and 5 via a controllable key 8 is a measuring instrument 9 which produces signals to operate a system 10 controlling the transfer of the electrodes, said system by driving the electric motors 2 and 3, is operating in the mode of a follow-up feed ensuring the stabilization of the interelectrode gap.

Connected in parallel with the generator 6 of working pulses is an auxiliary generator 11.

The measuring instrument 9 is connected to the master switch 12, which actuates the auxiliary generator 11 and keys 7 and 8.

FIG. 2 represents an embodiment of the same device, in which, as compared with the device shown in FIG. 1, the protection of the generator 6 of working pulses against the pulses of the auxiliary generator 11, is effected in a different manner. In the circuit of the generator 6 of working pulses there is provided a diode 13 inhibiting the pulses of the auxiliary generator 11 getting to the generator 6 of working pulses and measuring instrument 9.

In the present embodiment of the invention, the actuation of the master switch 12 results only in the enabling of the auxiliary generator 11.

In the embodiment of the electric circuit of the device represented in FIG. 3, the generator of working pulses is composed of charging circuits 6', a capacitance power storage means 14, a controllable key, which is essentially a thyratron 15, and a pulse step-down transformer 16, whose secondary winding 17 is connected to the workpiece-electrode 4 and tool-electrode 5.

Connected in parallel with the secondary winding 17 of the transformer 16 through a controllable key 18 is a measuring instrument 9', connected with a system 10' controlling the transfer and a master switch 12. The master switch 12 is, in its turn, connected to keys 19, 20, which, when the master switch 12 is disabled, connect the electrodes 4 and 5 to the secondary winding 17 of the transformer 16 and to keys 22 and 23 which then block the current. The master switch 12 is similar to that inserted in the circuit diagram shown in FIGS. 1 and 2.

The device, represented in FIG. 1, operates as follows.

The generator 6 of working pulses is kept permanently switched on and supplies pulse voltage through the open key 7 to the electrodes 4 and 5. The presence of a preset gap between these electrodes provides for the formation of periodic pulse discharges therebetween, which results in the removal of the material from the article or workpiece being machined, which is conducive to an increase in the gap between the electrodes 4 and 5. This changes the control signal, incoming to the system 10 controlling the transfer of the electrodes 4 and 5 from the measuring instrument 9, the electric motors 2 and 3 being thereby given signals, corresponding to the prescribed direction of the relative transfer motion of the electrodes.

The required transfer occurs up to the moment when a decrease in the magnitude of the interelectrode gap (caused by the relative transfer of the electrodes 4 and 5) restores the required value of the control signal, fed by the measuring instrument 9 to the follow-up system 10.

Thereafter the transfer motion is discontinued until the interelectrode gap increases again. In the course of this normal cycle of the device operation, master switch 12 and auxiliary generator 11 are disconnected, while the keys 7 and 8 are actuated.

The master switch is adapted to control the operation of the keys 7 and 8, as well as that of the auxiliary generator 11.

On the contrary, the disconnection of the master switch 12 opens the keys 7 and 8, and disconnects the auxiliary generator 11.

The connection of the master switch 12 is caused by a certain level of the control signal coming from the measuring instrument 9.

Disconnecting of the master switch 12 occurs spontaneously after a certain period of time, which is preset by adjusting a time delay element incorporated in its circuit (not shown in the drawing).

In the case of casual short-circuiting of the electrodes 4 and 5, which may be caused, for example, by foreign inclusions in the article or workpiece being machined, the control signal, sent both into the system 10 controlling the transfer for the directed relative transfer motion of the electrodes 4, 5, and into the master switch 12, changes to such an extent as to cause the working feed to cease, and connect the master switch 12, which, via the keys 7 and 8, opens the circuit of the generator 6 of working pulses and that of the measuring instrument 9, and actuates the auxiliary generator 11. Current pulses of an increased amplitude, fed by the auxiliary generator 11, when passing through a contact between the electrodes 4 and 5, cause the destruction of contact bridges therebetween, thus creating the required interelectrode gap.

On the elapse of the proper time delay for self-disconnection, the master switch 12 is disconnected, thus restoring the original electric circuit and disconnecting auxiliary generator 11.

In the case the interelectrode gap is formed, the signal, received from the measuring instrument 9 after the master switch 12 has been disconnected, possesses characteristics, which do not cause the repeated cutting in of the master switch 12 so that the normal process of machining is continued ensured by the generator 6 of working pulses and the system 10 controlling the transfer.

If no interelectrode gap has been created during the operation of the auxiliary generator, the restoring of the electric circuit caused by the disconnection of the masterswitch, will make a signal, corresponding to the contact between the electrodes 4 and 5, to be sent from the measuring instrument 9 to the master switch, this resulting in the master switch being enabled again for a certain period of time.

The auxiliary generator 11 will be switched in again accordingly till the contact between the electrodes is eliminated.

The device represented in FIG. 3 operates in the following manner.

High-voltage charging current from the generator 6' of working pulses charges a capacitor 14. The charging having been completed, the thyratron 15 is opened, the capacitor 14 is discharged through the primary winding 21 of the transformer 16, thus creating a decreased pulse voltage at its secondary winding 17 connected to the electrodes 4 and 5, said voltage causes a pulse discharge between the latter.

The capacitor 14 having been discharged, the thyratron 15 is closed, and a new charging cycle of the capacitor 14 commences. These cycles follow each other at a high frequency, thus causing a high-frequency electroerosion process between the electrodes 4 and 5.

The system 10' for controlling the transfer by a signal from the measuring instrument 9' ensures the relative transfer of the electrodes 4, 5, thus stabilizing the magnitude of the interelectrode gap. The master switch 12 is thereby disconnected, and the level of signal received from the measuring instrument 9' proves to be insufficient for its cutting in. In the case of a casual short-circuit between the electrodes 4, 5, the signal from the measuring instrument 9' interrupts the sending of signals from the system 10' controlling the transfer to the electric motors 2 and 3 and enables the master switch 12, which disables the key 18, disconnecting thereby the circuit of the measuring instrument 9', disables the keys 19 and 20, and enables the keys 22 and 23, which causes the disconnection of the primary winding 21 and secondary winding 17 of the output transformer 16 and provides for connecting the electrodes 4 and 5 directly to the output of the generator 6' of working pulses.

Simultaneously the frequency of the generator 6' of working pulses is switched over to preserve the average value of current flowing through the thyratron 15.

The short-circuited electrodes 4, 5 cause the high-voltage discharge circuit to be closed.

The current in the circuit is limited only by the natural resistance of the thyratron 15. Current pulses of an amplitude thus increased pass through the electrodes 4 and 5, breaking contact bridges therebetween and creating the required gap. The protection of the thyratron 15 is ensured owing to a decrease in the frequency of generated pulses.

Though the present invention is described in connection with a preferred embodiment thereof, it is obvious that modifications and alternations are possible without departing from the true idea and scope of the invention, as those skilled in the art will easily understand.

I claim:

1. A method of electroerosion machining comprising supplying periodic pulses of electric energy with a relatively high-frequency and comparatively small amplitude of current from an intermittent current source to a gap between a tool and a work-piece serving as electrodes, displacing the tool relative to the work-piece at a controlled speed in forward-stop operating conditions, supplying to the gap periodic pulses of electric energy with a comparatively high amplitude of current of a relatively low-frequency simultaneously with said high-frequency pulses during a predetermined time period in which said gap is non-existent and the electrodes are in contact with one another, restoring the gap to its predetermined value, and, discontinuing the supply of the low-frequency pulses and resuming the relative movement of the electrodes after the predetermined value of the gap is restored.

2. A method of electroerosion machining comprising supplying periodic pulses of electric energy with a relatively high frequency and comparatively small amplitude of current from an intermittent current source to a gap between a tool and a work-piece serving as electrodes, displacing the tool relative to the work-piece at a controlled speed in forward-stop operating conditions, discontinuing the application of the pulses and the relative movement of the electrodes during a predetermined time period in which said gap is non-existent and the electrodes are in contact with one another, while supplying the gap with periodic pulses of electric energy with a relatively low-frequency and comparatively high amplitude of current, restoring the gap to its predetermined value, and discontinuing the supply of the low-frequency pulses and resupplying the high-frequency pulses and resuming the relative movement of the electrodes when the predetermined value of the gap is restored.

3. A device for electroerosion machining comprising a tool disposed with a gap relative to a workpiece, said tool and workpiece constituting electrodes, means for displacing the tool relative to the workpiece along a predetermined trajectory at a controlled speed in forward-stop operating conditions, and means for selectively feeding to said tool and workpiece short periodic pulses of energy of a relatively high-frequency with a comparatively low amplitude of current and in a predetermined period of time when the gap is non-existent short periodic pulses of energy of a relatively low-frequency with a comparatively high amplitude of current.

4. A device for electroerosion machining comprising a tool disposed with a gap relative to a workpiece, said tool and workpiece constituting electrodes, means for displacing the tool at a controlled speed in a forward-stop operating condition, a supply source of periodic high-frequency pulses of a relatively small amplitude of current; and means automatically actuated in response to a decrease of the value of the gap to zero to apply, across said gap, in a predetermined period of time periodic low-frequency pulses of a relatively high amplitude of current.

5. A device for electroerosion machining comprising a tool disposed with a gap relative to a workpiece, said tool and workpiece constituting electrodes, means for displacing the tool relative to the workpiece along a predetermined trajectory at a controlled speed in a forward-stop operating condition, a supply source of periodic high-frequency pulses of a relatively small amplitude of current connected to said electrodes for producing pulse discharges across said gap, means for applying periodic low-frequency pulses of a relatively high amplitude of current to said electrodes and across the gap when its value is zero; and means automatically actuated with a predetermined delay in time in response to actuation of the first said means to discontinue, after a predetermined period of time, the supply across the gap of the relatively low-frequency periodic pulses of energy and start again the supply across the gap only of the periodic relatively high-frequency pulses of energy with the comparatively low amplitude of current.

6. A device for electroerosion machining comprising a tool spaced with a gap relative to a workpiece; said tool and workpiece constituting electrodes; a source of periodic pulses, for producing across said gap, pulses of energy of a relatively high-frequency with a comparatively low amplitude of current to carry out electroerosion machining; a source of periodic pulses, for producing across said gap, pulses of energy of a relatively low-frequency with a comparatively high amplitude of current for carrying out electroerosion machining when the value of the interelectrode gap is zero and the electrodes are in contact with one another; control circuits for switching on said source of low-frequency pulses with high amplitude of current in response to a decrease of the interelectrode gap to zero and for switching it off after a predetermined period of time; and a diode for separating the circuits of both said sources of periodic pulses of energy.

7. A device for electroerosion machining comprising a tool spaced with a gap relative to a workpiece; said tool and workpiece constituting electrodes, a source of periodic pulses, for producing across said gap, pulses of energy of a relatively high-frequency and a comparatively low amplitude of current for carrying out electroerosion machining; a source of periodic pulses, for producing across said gap, pulses of energy of a relatively low-frequency and a comparatively high amplitude of current for carrying out electroerosion machining when the value of the interelectrode gap is zero and the electrodes are in contact with one another; control circuits for disconnecting from the electrodes the source of pulses of high-frequency and low amplitude of current and connecting to the electrodes the source of pulses of low-frequency and high amplitude of current in response to a decrease of the interelectrode gap to zero, and for switching off the source of pulses of low-frequency and high amplitude of current and switching on the source of pulses of high-frequency and low amplitude of current after a predetermined period of time; and a commutating element controlling said control circuits for connecting and disconnecting the electrodes with said sources of pulses.

8. A device for electroerosion machining comprising a tool spaced with a gap relative to a workpiece; said tool and workpiece constituting electrodes; a source of periodic pulses of energy with a variable frequency and a high amplitude of voltage; a pulse step-down transformer for decreasing the voltage of the pulses of energy supplied to the electrodes; a control circuit for automatically switching off said transformer and decreasing the frequency of periodic pulses of the source in response to a decrease of the value of the interelectrode gap below a predetermined value and for restoring, after a predetermined period of time, the connection of said transformer and the frequency of the periodic pulses of the source, a commutating element controlling said control circuit and inserted in the circuits of the primary and secondary windings of said transformer to automatically break said primary and secondary windings of the transformer and connect the source of the pulses of high voltage with the electrodes in response to the actuation of said control circuit and to restore the connection of said circuits of the transformer in response to the switching-off of the control circuits after a predetermined period of time.

* * * * *